Figure 4:
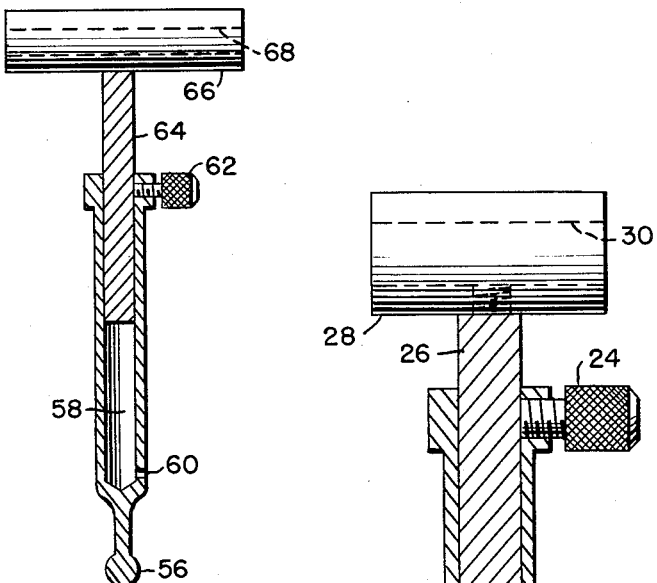

May 4, 1954

C. A. MUNDEL 2,677,188

MICROMETRIC GAUGING DEVICE

Filed Sept. 14, 1949

2 Sheets-Sheet 1

INVENTOR
CORNELIUS A. MUNDEL

BY *Ray Eilers*

ATTORNEY

Patented May 4, 1954

2,677,188

UNITED STATES PATENT OFFICE 2,677,188

MICROMETRIC GAUGING DEVICE

Cornelius A. Mundel, St. Louis, Mo.

Application September 14, 1949, Serial No. 115,660

8 Claims. (Cl. 33—167)

This invention relates to improvements in gauging devices. More particularly this invention relates to improvements in gauging devices which can be used to determine the accuracy of outside micrometers.

It is therefore an object of the present invention to provide an improved gauging device that can be used to determine the accuracy of outside micrometers.

It has been found that when outside micrometers are used rather steadily, the fixed and movable anvils of those micrometers tend to wear and lose parallelism. In addition, the threads of the micrometer screws of outside micrometers tend to become worn. In either of these events, the measurements made by the outside micrometers will be inexact and inaccurate. Accordingly, where precision work is being done, the outside micrometers must be tested periodically; the tests including a determination of the parallelism of the faces of the fixed and movable anvils of the outside micrometers, and a determination of the accuracy of the threads of the micrometer screws. This testing is customarily done wtih outside micrometers by inserting gauge blocks or precision balls between the confronting faces of the fixed and movable anvils of the micrometers; parallelism being checked by noting the readings on the micrometer scales when the gauge blocks or precision balls are set at various points around the peripheries of the anvils, and accuracy of the threads of the micrometer screws being checked by noting the readings on the micrometer scales when gauge blocks or precision balls of various sizes are used. Where the outside micrometers are small, no particular difficulty is experienced in making the required tests. With such micrometers it is usually possible to select and use a single gauge block or precision ball in checking a particular setting of the micrometer screws; the gauge blocks and precision balls, up to one inch, being made so each larger gauge block or precision ball is only fractionally larger than the next smaller gauge block or precision ball. Above one inch, however, the gauge blocks do not increase by small fractions of an inch; and thus it is necessary in testing larger outside micrometers to use more than one gauge block. Every effort is made to facilitate ready handling of two or more of the gauge blocks; those gauge blocks being ground and lapped so precisely that when they are pressed together air pressure will hold them in contact with each other. Where only two or three such gauge blocks are pressed together, those blocks are easily handled. However when four or more such gauge blocks must be pressed together, they become bulky, heavy and hard to handle. The present invention obviates the need of pressing a large number of gauge blocks together by providing a gauging device which can be releasably secured to an outside micrometer to hold a micrometer standard squarely between the anvils of the micrometer. This micrometer standard will reduce the unoccupied space between the anvils of the outside micrometer to such a small value that one gauge block or precision ball can fill that space. The gauging device will hold the micrometer standard fixedly in position and free the inspector's hands for manipulation of the gauge block or precision ball. This assures easier and more accurate gauging of the micrometers. It is therefore an object of the present invention to provide a gauging device which can releasably hold a micrometer standard squarely between the anvils of an outside micrometer.

The gauging device provided by the present invention will hold the micrometer standard squarely between the anvils of the outside micrometer, but yet it will permit that standard to be moved away from either of those anvils. By pressing that micrometer standard against one anvil of the micrometer while spacing it from the other, it is possible to determine the parallelism of the other anvil; and then it is possible to determine the parallelism of the one anvil by shifting the micrometer standard so it presses against the other anvil. This provides a simple, quick, and accurate way of determining the parallelism of the faces of anvils on large outside micrometers. It is therefore an object of the present invention to provide a gauging device that holds a micrometer standard squarely between the anvils of an outside micrometer; but yet will permit that standard to be moved away from either of those anvils.

The gauging device provided by the present invention has a bifurcated base with set screws that releasably secure the gauging device to the yoke of the outside micrometer. A cylinder is releasably secured to the base of the gauging device, and that cylinder can be set at various angles to cause the axis of that cylinder to intersect a line between the two anvils of the outside micrometer. A plunger is carried by the cylinder; and that plunger, in turn, carries a sleeve which will support a micrometer standard. The ability of the cylinder to lie in a number of different positions makes it possible for that cylinder to hold the sleeve on the plunger precisely coaxial with the anvils of the micrometer even though the base of the gauging device is askew. This makes it possible to hold the micrometer standard precisely in position between the tow anvils of the micrometer without necessitating precise setting of the base of the gauging device. It is therefore an object of the upresent invention to provide a gauging device for outside micrometers which has a bifurcated base securable to the yoke of the micrometer by set screws, and which has a cylinder and sleeve that can be set at different angles relative to the bifurcated base.

The adjustability of the cylinder provided by the present invention is assured by forming a ball on the lower end of that cylinder and by holding that ball end within a socket of the base by a slotted clamping plate. The clamping plate and ball end of the cylinder are separable to permit replacement of the cylinder with larger or smaller cylinders where larger or smaller outside micrometers are to be checked. It is therefore an object of the present invention to provide a cylinder with a ball end and a slotted clamping plate to hold that ball end in a socket of the base.

The sleeve that supports the micrometer standard has precisely bored end portions and has an undercut portion therebetween. The undercut portion permits the micrometer standard to seat fully in the bored ends of the sleeve, thus enabling the sleeve to hold that standard precisely. It is therefore an object of the present invention to provide a sleeve with bored ends and an undercut portion therebetween.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 1:
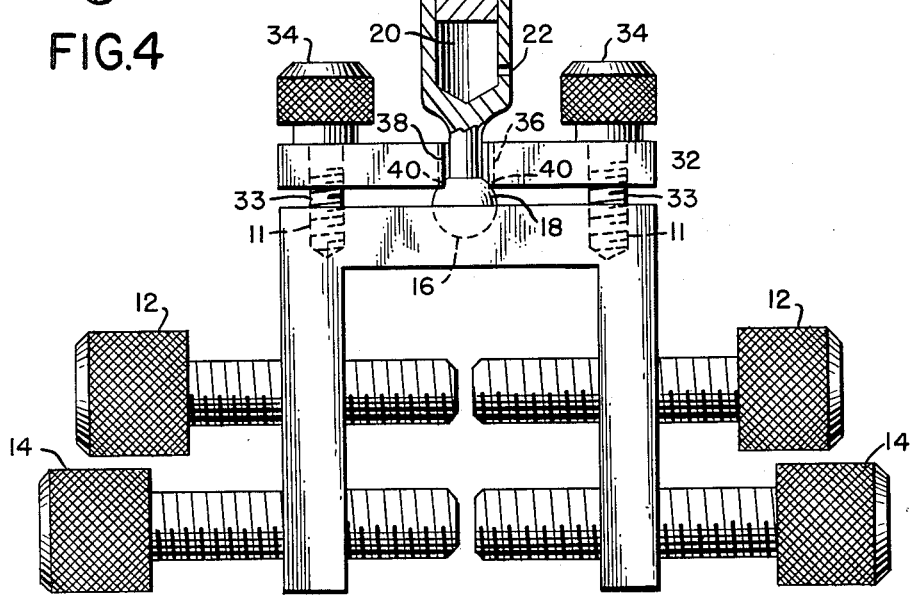
Figure 2:
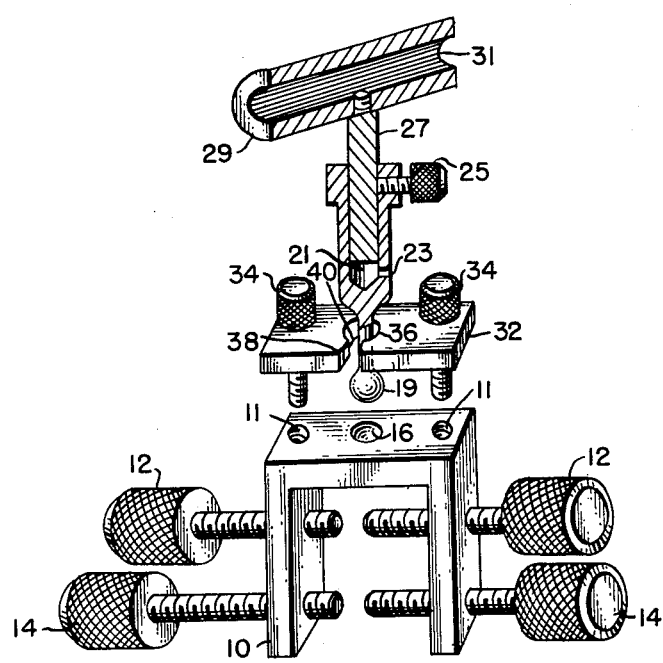
Figure 3:
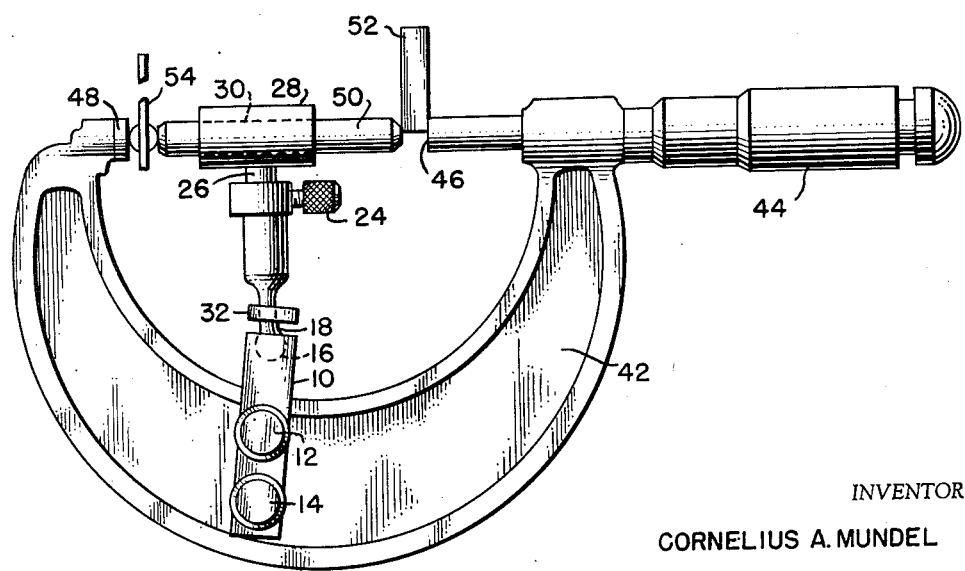

In the drawing,

Fig. 1 is a partially-sectioned, front elevational view of a gauging device that is made in accordance with the principles and teachings of the present invention, Fig. 2 is a partially-sectioned, perspective view of the bifurcated base of the gauging device of Fig. 1, as a different plunger, cylinder and sleeve are about to be assembled with that base, Fig. 3 is a side-elevational view of the gauging device of Fig. 1 as it is assembled with an outside micrometer and holds a micrometer standard between the anvils of that micrometer (the set screws for the clamping plate being removed for clarity of showing).

Figure 5:
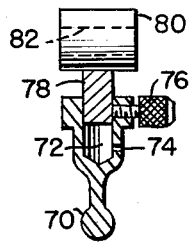

Fig. 4 is a partially-sectioned, side-elevational view of an elongated cylinder, plunger, and sleeve, and Fig. 5 is a partially-sectioned, side-elevational view of a short cylinder, plunger and sleeve.

Referring to the drawing in detail, the numeral 10 generally denotes a bifurcated base for a gauging device. The base 10 will preferably be made of sturdy metal such as steel, and it will have threaded openings therethrough to receive two pairs of set screws 12 and 14. The inner ends of these set screws will confront each other; and they can be moved into engagement with the sides of the yoke of an outside micrometer to lock the base 10 against the yoke of the micrometer. A socket 16 of spherical curvature is formed in the upper end of the base 10; and threaded openings 11 are provided in the upper end of the base 10 at points spaced outwardly from the spherical socket 16.

The socket 16 releasably receives the ball end 18 of a cylinder which has an axial bore 20 therein. The cylinder has a vent 22 at the lower end of the bore 20, and it also has a threaded opening at the upper end of the bore 20; the vent 22 permitting air to enter or leave the cylinder, and the threaded opening receiving a set screw 24. A plunger 26 telescopes within the axial bore 20 of the cylinder, and that plunger carries a sleeve 28 at the upper end thereof. The sleeve 28 has an axial opening 30 therethrough, and that opening is dimensioned to hold a micrometer standard snugly and yet permit telescoping movement of the micrometer standard relative to the sleeve. The ends of the axial opening 30 are precisely bored, and the portion in between is undercut. The undercutting of the portion in between the ends of opening 30 avoids the creation of a taper within the opening 30 as that opening is drilled or bored; thus the undercutting enables the sleeve 28 to hold the micrometer standard squarely between the anvils of a micrometer.

The ball end 18 of the cylinder is spaced from the bore 20 by a neck portion, and that neck portion extends through a slot 38 in a clamping plate 32. The slot 38 extends to and is contiguous with a circular opening 36 in the clamping plate 32, and the bottom of that opening has a chamfer 40. This chamfer is at approximately forty-five (45) degrees to the plane of the lower face of the clamping plate 32, and it will be generally tangential to the top of the ball end 18 of the cylinder. Set screws 34 pass through spaced openings 33 in the clamping plate 32 and seat in the threaded openings 11 of the base 10.

When the set screws 34 are threaded tightly into the openings 11, they will hold the clamping plate 32 tightly against the upper surface of the ball end 18 of the cylinder. In doing so, those set screws will press the chamfer 40 tightly against the upper surface of the ball end 18 and will thus lock the cylinder against movement relative to the base 10. Release of the set screws 34 will, however, permit the cylinder to be inclined relative to base 10 and clamping plate 32; the opening 36 in the clamping plate 32 being large enough to permit tilting of the cylinder relative to that plate.

In use, the base 10 of the gauging device will be secured to the yoke of an outside micrometer by telescoping the legs of that base over the yoke of the micrometer and then setting the confronting faces of set screws 12 and 14 against the yoke of the micrometer, as shown particularly in Fig. 3. It is not necessary to set the base 10 precisely at the center of the yoke 42 of the outside micrometer because the ball and socket connection between the base 10 and the cylinder will compensate for any off-center relationship of the base 10 and yoke 42. Once the base 10 has been set, a micrometer standard 50 of the proper length will be telescoped within the opening 30 of sleeve 28; and that standard will be moved until it is squarely between the anvils 46 and 48 of the micrometer. This movement is made possible by loosening the set screws 24 and 34 and by moving the plunger 26 and the cylinder. The movable anvil 46 of the micrometer will then be moved against the end of the micrometer standard 50 and will press it against the fixed anvil 48. Thereafter the set screws 24 and 34 can be tightened; and those set screws will enable the gauging device to hold the micrometer standard 50 precisely coaxial with the anvils 46 and 48 of the micrometer after the movable anvil 46 has been backed away.

The micrometer standard 50 will then be moved against one of the anvils 46 or 48, a gauge block 52 or a precision ball 54 will be set adjacent the other end of the micrometer standard 50, and then the micrometer screw 44 will be rotated to cause the other anvil to engage the gauge block or precision ball. The reading on the micrometer scale should then equal the combined lengths of the micrometer standard and the gauge block or precision ball. Parallelism of that anvil can be tested by setting the gauge block or precision ball at various points around the periphery of the anvil. To check the parallelism of the other anvil, it is only necessary to telescope the micrometer standard away from that other anvil and set the gauge block or precision ball at various points on the anvil's periphery. The bored ends of opening 30 in sleeve 28 will hold the micrometer standard precisely coaxial with the anvils 46 and 48 in all positions of that standard and yet permit telescoping movement of that standard relative to that sleeve.

To determine the accuracy of the threads of the micrometer screw 44 at various points, it is only necessary to use micrometer standards and gauge blocks of the desired lengths. The drawing shows a gauge block at one end of the micrometer standard and a precision ball at the other end, but usually one end of the micrometer standard will bear against one or the other of the anvils of the micrometer. By using gauge blocks up to one (1) in chain length, and by using micrometer standards of different lengths, it is possible to test the micrometer at almost any setting.

Universal movement of the micrometer standard is made possible by the mounting of the cylinder, plunger and sleeve. The cylinder can be tilted in all directions relative to the axis of opening 36 in clamping plate 32, and the plunger 26 can be telescoped in and out of the cylinder while being rotated relative to that cylinder. Almost any desired setting of the position of the micrometer standard can be attained by proper adjustment of the cylinder, plunger, and sleeve.

The micrometer standards must be held precisely coaxial with the anvils of the micrometers; lest the test of parallelism be inaccurate. This relation is best effected by keeping set screw 24 loose until the anvils engage and align the micrometer standard. Once the micrometer standard is precisely coaxial, the set screw 24 can be tightened. The micrometer standard 50 shown in the drawing has chamfered ends, but micrometer standards with squared-off ends can be used.

The cylinder, plunger and sleeve sleeve shown in Fig. 1 are for micrometers of average size; and where larger outside micrometers are to be tested, the cylinder, plunger, and sleeve of Fig 2 will be used That cylinder has a ball end 19 and an axial bore 21 The bore 21 has a vent 23 at the lower end thereof and has a threaded opening at the top thereof in which the set screw 25 can be seated The axial bore 21 receives a plunger 27 and that plunger supports a sleeve 29 with an axial bore 31 The vents at the lower ends of the cylinders permit the use of close fits between the cylinders and plungers In the absence of these vents, considerable pressure might have to be applied to telescope the plungers into or out of the cylinders If an outside micrometer with a deep yoke is to be checked, the plunger, cylinder and sleeve of Fig 4 will be used That plunger has a ball end 56, a bore 58, and a vent 60 A set screw 62 is seated in a threaded opening adjacent the upper end of the cylinder, and that set screw releasably holds the plunger 64 in position A sleeve 66 is provided atop the upper end of the plunger 64, and that sleeve has a bore 68 therethrough.

When a very small outside micrometer is to be checked, the cylinder, plunger and sleeve of Fig. 5 will be used. That cylinder has a ball end 70, an axial bore 72, and a vent 74. A set screw 76 will be seated in a threaded opening adjacent the upper end of the cylinder and that set screw will releasably hold the plunger 78 in position. Plunger 78 carries sleeve 80 at the top thereof, and that sleeve has an axial bore 82. Each of the ball ends 18, 19, 56 and 70 can be held tightly in the socket 16 by the clamping plate 32. In this way, the one base and the one clamping plate can suffice to hold a number of cylinder of different size in position. Moreover, each of the plungers can be used with each of the cylinders; thus making it possible to fit almost all sizes of micrometers.

Very little skill is required in securing the base 10 to the micrometer yoke; the gauging device being usable even when the base 10 is considerably off of center, as shown in Fig. 3. Ordinarily the inspector will have enough vision and skill to place the base 10 close to the center of the micrometer yoke; and such placing is adequate. Any off-center positioning of the base 10 will be fully compensated for by the setting of the ball ends of the cylinders in the socket of the base.

Whereas a preferred embodiment of the present invention has been shown and described in the accompanying description it should be apparent to those skilled in the art that various changes may be made in the form of the invention without affecting the scope thereof.

What I claim is:

1. A gauging device that is adapted to facilitate accurate and simple checking of the parallelism of the faces of the anvils of an outside micrometer and to facilitate accurate and simple checking of the accuracy of the threads of the micrometer screw of said micrometer and that comprises a bifurcated base, a plurality of set screws that are threadedly supported by said bifurcated base and releasably secure said bifurcated base to the yoke of said micrometer, said base having a socket therein, a cylinder, a ball end on said cylinder, said ball end being dimensioned to fit said socket in said base, a clamping plate, said clamping plate having a slot therein to receive the portion of said cylinder adjacent the ball end of said cylinder, said clamping plate having an opening therein contiguous with said slot, said opening being smaller than said ball end but being larger than that portion of said cylinder adjacent said ball end, a chamfer on the clamping plate adjacent said opening, a set screw that is carried by said clamping plate and is adapted to secure said clamping plate adjacent said base and cause said clamping plate to lock said ball end of said cylinder against movement, said cylinder having an axial bore therein that receives a plunger, said cylinder having a vent therein adjacent the lower end of said axial bore, a second set screw that is carried by said cylinder and is adjacent the upper end of said axial bore, said second set screw being adapted to selectively engage said plunger and thereby releasably lock said plunger against shifting relative to said cylinder, and a sleeve that is secured to and carried by said plunger, said sleeve having the ends thereof precisely bored and having the portion therebetween undercut, said bored ends of said sleeve holding a cylindrical micrometer standard snugly but permitting axial shifting of said standard relative to said sleeve, said base-supported set screws and socket and ball end and clamping plate and cylinder and plunger being adjustable relative to said yoke of said micrometer to place said sleeve in precise coaxial relation with the anvils of said micrometer.

2. A gauging device that is adapted to facilitate accurate and simple checking of the parallelism of the faces of the anvils of an outside micrometer and to facilitate accurate and simple checking of the accuracy of the threads of the micrometer screw of said micrometer and that comprises a bifurcated base, a plurality of set screws that are threadedly supported by said bifurcated base and releasably secure said bifurcated base to the yoke of said micrometer, said base having a socket therein, a cylinder, a ball end on said cylinder, said ball end being dimensioned to fit said socket in said base, a clamping plate, said clamping plate having a slot therein to receive the portion of said cylinder adjacent the ball end of said cylinder, said clamping plate having an opening therein contiguous with said slot, said opening being smaller than said ball end but being larger than that portion of said cylinder adjacent said ball end, a chamfer on the clamping plate adjacent said opening, a set screw that is carried by said clamping plate and is adapted to secure said clamping plate adjacent said base and cause said clamping plate to lock said ball end of said cylinder against movement, said cylinder having an axial bore therein that receives a plunger, said cylinder having a vent therein adjacent the lower end of said axial bore, a second set screw that is carried by said cylinder and is adjacent the upper end of said axial bore, said second set screw being adapted to selectively engage said plunger and thereby releasably lock said plunger against shifting relative to said cylinder, and a sleeve that is secured to and carried by said plunger, said base-supported set screws and socket and ball end and clamping plate and cylinder and plunger being adjustable relative to said yoke of said micrometer to place said sleeve in precise coaxial relation with the anvils of said micrometer.

3. A gauging device that is adapted to facilitate accurate and simple checking of the parallelism of the faces of the anvils of an outside micrometer and to facilitate accurate and simple checking of the accuracy of the threads of the micrometer screw of said micrometer and that comprises a bifurcated base, a plurality of set screws that are threadedly supported by said bifurcated base and releasably secure said bifurcated base to the yoke of said micrometer, said base having a socket therein, a cylinder, a ball end on said cylinder, said ball end being dimensioned to fit said socket in said base, a clamping plate, said clamping plate having a slot therein to receive the portion of said cylinder adjacent the ball end of said cylinder, said clamping plate having an opening therein contiguous with said slot, said opening being smaller than said ball end but being larger than that portion of said cylinder adjacent said ball end, a chamfer on the clamping plate adjacent said opening, a set screw that is carried by said clamping plate and is adapted to secure said clamping plate adjacent said base and cause said clamping plate to lock said ball end of said cylinder against movement, said cylinder having an axial bore therein that receives a plunger, said cylinder having a vent therein adjacent the lower end of said axial bore, and a sleeve that is secured to and carried by said plunger, said sleeve having the ends thereof precisely bored and having the portion therebetween undercut, said bored ends of said sleeve holding a cylindrical micrometer standard snugly but permitting axial shifting of said standard relative to said sleeve, said base-supported set screws and socket and ball end and clamping plates and cylinder and plunger being adjustable relative to said yoke of said micrometer to place said sleeve in precise coaxial relation with the anvils of said micrometer.

4. A gauging device that is adapted to facilitate accurate and simple checking of the parallelism of the faces of the anvils of an outside micrometer and to facilitate accurate and simple checking of the accuracy of the threads of the micrometer screw of said micrometer and that comprises a bifurcated base, a plurality of set screws that are threadedly supported by said bifurcated base and releasably secure said bifurcated base to the yoke of said micrometer, said base having a socket therein, a cylinder, a ball end on said cylinder, said ball end being dimensioned to fit said socket in said base, a clamping plate, said clamping plate having a slot therein to receive the portion of said cylinder adjacent the ball end of said cylinder, said clamping plate having an opening therein contiguous with said slot, said opening being smaller than said ball end but being larger than that portion of said cylinder adjacent said ball end, a chamfer on the clamping plate adjacent said opening, a set screw that is carried by said clamping plate and is adapted to secure said clamping plate adjacent said base and cause said clamping plate to lock said ball end of said cylinder against movement, said cylinder having an axial bore therein that receives a plunger, a second set screw that is carried by said cylinder and is adapted to selectively engage said plunger and thereby releasably lock said plunger against shifting relative to said cylinder, and a sleeve that is secured to and carried by said plunger, said sleeve having the ends thereof precisely bored and and having the portion therebetween undercut, said bored ends of said sleeve holding a cylindrical micrometer standard snugly but permitting axial shifting of said standard relative to said sleeve, said base-supported set screws and socket and ball end and clamping plate and cylinder and plunger being adjustable relative to said yoke of said micrometer to place said sleeve in precise coaxial relation with the anvils of said micrometer.

5. A gauging device that is adapted to facilitate accurate and simple checking of the parallelism of the faces of the anvils of an outside micrometer and to facilitate accurate and simple checking of the accuracy of the threads of the micrometer screw of said micrometer and that comprises a bifurcated base, a plurality of set screws that are threadedly supported by said bifurcated base and releasably secure said bifurcated base to the yoke of said micrometer, said base having a socket therein, a cylinder, a ball end on said cylinder, said ball end being dimensioned to fit said socket in said base, a clamping plate, a set screw that is carried by said clamping plate and is adapted to secure said clamping plate adjacent said base and cause said clamping plate to lock said ball end of said cylinder against movement, said cylinder having an axial bore therein that receives a plunger, said cylinder having a vent therein, a second set screw that is carried by said cylinder and is adapted to selectively engage said plunger and thereby releasably lock said plunger against shifting relative to said cylinder, and a sleeve that is secured to and carried by said plunger, said sleeve having the ends thereof precisely bored and having the portion therebetween undercut, said bored ends of said sleeve holding a cylindrical micrometer standard snugly but permitting axial shifting of said standard relative to said sleeve, said socket and ball end and clamping plate and cylinder and plunger being relatively adjustable to place said sleeve in precise coaxial relation with the anvils of said micrometer.

6. A gauging device that is adapted to facilitate accurate and simple checking of the parallelism of the faces of the anvils of an outside micrometer and to facilitate accurate and simple checking of the accuracy of the threads of the micrometer screw of said micrometer and that comprises a bifurcated base, a plurality of set screws that are threadedly supported by said bifurcated base and releasably secure said bifurcated base to the yoke of said micrometer, said base having a socket therein, a cylinder a ball end on said cylinder, said ball end being dimensioned to fit said socket in said base, a clamping plate, a set screw that is carried by said clamping plate and is adapted to secure said clamping plate adjacent said base and cause said clamping plate to lock said ball end of said cylinder against movement, said cylinder having an axial bore therein that receives a plunger, said cylinder having a vent therein adjacent the lower end of said axial bore, a second set screw that is carried by said cylinder and is adapted to selectively engage said plunger and thereby releasably lock said plunger against shifting relative to said cylinder, and a sleeve that is secured to and carried by said plunger, said sleeve having the ends thereof precisely bored and having the portion therebetween undercut, said bored ends of said sleeve holding a micrometer standard snugly but permitting axial shifting of said standard relative to said sleeve, said socket and ball end and clamping plate and cylinder and plunger being adjustable relative to said yoke of said micrometer to place said sleeve in precise coaxial relation with the anvils of said micrometer.

7. A gauging device that is adapted to facilitate accurate and simple checking of the parallelism of the faces of the anvils of an outside micrometer and to facilitate accurate and simple checking of the accuracy of the threads of the micrometer screw of said micrometer and that comprises a bifurcated base, a plurality of set screws that are threadedly supported by said bifurcated base and releasably secure said bifurcated base to the yoke of said micrometer said base having a socket therein, a cylinder, a ball end on said cylinder, said ball end being dimensioned to fit said socket in said base, a clamping plate, a set screw that is carried by said clamping plate and is adapted to secure said clamping plate adjacent said base and cause said clamping plate to lock said ball end of said cylinder against movement, said cylinder having an axial bore therein that receives a plunger, and a sleeve that is secured to and carried by said plunger and that can carry a micrometer standard, said socket and ball end and clamping plate and cylinder and plunger being adjustable relative to said yoke of said micrometer to place said sleeve in precise coaxial relation with the anvils of said micrometer.

8. A gauging device that is adapted to facilitate accurate and simple checking of the parallelism of the faces of the anvils of an outside micrometer and to facilitate accurate and simple checking of the accuracy of the threads of the micrometer screw of said micrometer and that comprises a base, a plurality of set screws that are threadedly supported by said base and releasably secure said base to said micrometer, a cylinder, a ball and socket connection between said base and said cylinder, a clamping plate, a set screw that is carried by said clamping plate and is adapted to secure said clamping plate adjacent said base to lock said cylinder in position, said cylinder having a bore therein that receives a plunger, and a sleeve at the upper end of said plunger to support a micrometer standard, said plunger being disposable at various positions within said bore to provide spacings of different lengths between said base and said upper end of said plunger, said ball and socket connection and clamping plate and cylinder and plunger being relatively adjustable to place said sleeve in precise coaxial relation with the anvils of said micrometer.

References Cited in the file of this patent

UNITED STATES PATENTS

| Number | Name | Date |
|---|---|---|
| 925,280 | Bosworth | June 15, 1909 |
| 1,176,567 | Kamowske | Mar. 21, 1916 |
| 2,073,089 | Autenrieth | Mar. 9, 1937 |
| 2,101,317 | Lemieux | Dec. 7, 1937 |
| 2,124,006 | Parker | July 19, 1938 |
| 2,348,530 | Droitcour et al. | May 9, 1944 |
| 2,442,736 | Valentine | June 1, 1948 |
| 2,489,650 | Landrum | Nov. 29, 1949 |
| 2,522,255 | Climo | Sept. 12, 1950 |

FOREIGN PATENTS

| Number | Country | Date |
|---|---|---|
| 583,385 | Great Britain | 1947 |